Oct. 1, 1935.  L. L. IRVIN  2,016,235

PARACHUTE APPARATUS

Filed March 28, 1934  3 Sheets-Sheet 1

INVENTOR.
Leslie L. Irvin

BY Lancaster, Allwine and Rommel
ATTORNEYS.

Oct. 1, 1935.  L. L. IRVIN  2,016,235
PARACHUTE APPARATUS
Filed March 28, 1934   3 Sheets-Sheet 2
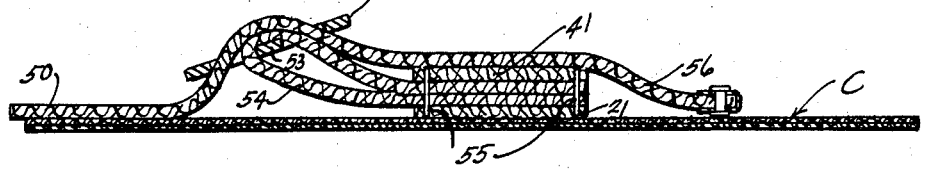
FIG. 4.
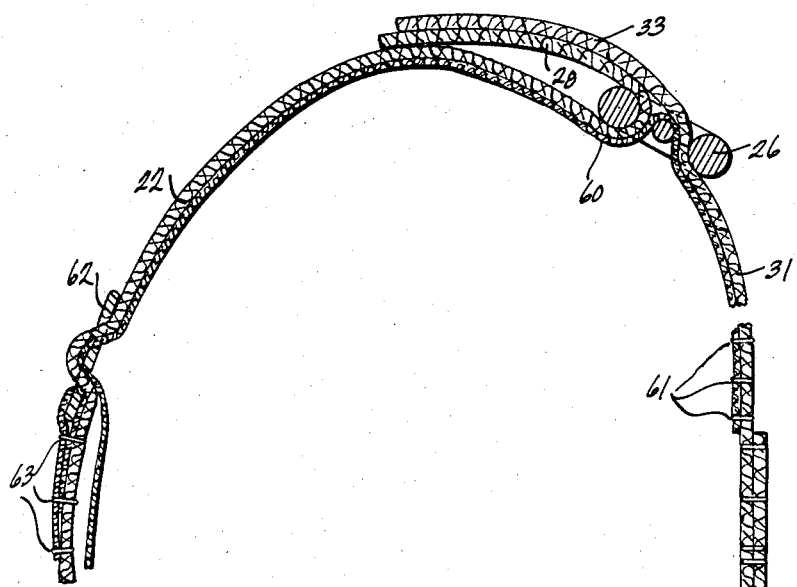
FIG. 5.
FIG. 9.
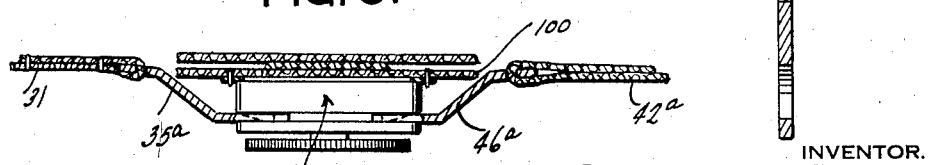
INVENTOR.
Leslie L. Irvin
BY Lancaster, Allwine and Rommel
ATTORNEYS.

Oct. 1, 1935.   L. L. IRVIN   2,016,235

PARACHUTE APPARATUS

Filed March 28, 1934   3 Sheets-Sheet 3

INVENTOR.
Leslie L. Irvin
BY
ATTORNEYS.

Patented Oct. 1, 1935

2,016,235

UNITED STATES PATENT OFFICE 2,016,235

PARACHUTE APPARATUS

Leslie L. Irvin, Letchworth, Herts, England, assignor to Irving Air Chute Company, Inc., Buffalo, N. Y., a corporation Application March 28, 1934, Serial No. 717,857
In Great Britain March 21, 1933

6 Claims. (Cl. 244—21)

This invention relates to improvements in parachute apparatus (for which I have filed a provisional specification in an application for patent in Great Britain #8,539 on March 21st, 1933, and filed a complete specification in said application for patent in Great Britain on February 27, 1934).

The primary object of this invention is the provision of improved parachute apparatus, particularly so far as the harness is concerned. The improvements consists in means for adjusting the harness to the stature of the wearer with facility including adapter means to automatically slip tighten the harness upon a wearer during a parachute drop.

A further object of the invention is the provision of improvements in quick release harnesses which are adapted to be released from the wearer at a single point; the improvements including means for efficiently and comfortably supporting the quick release fastening device in an adjustable relation upon the harness.

Other objects and advantages of the invention will be apparent during the course of the following detailed description.

In the accompanying drawings, forming a part of this specification, and wherein similar reference characters designate corresponding parts throughout the several views, Figure 1 is a perspective view of the improved single point release parachute harness showing the parts in assembled relation as they would substantially embrace the wearer.

Figures 4 and 5 are cross sectional views taken substantially on their respective lines in Figures 1 and 2 of the drawings.

Figure 9 is a cross sectional view taken substantially on the line 9—9 of Figure 6.

Figure 1:
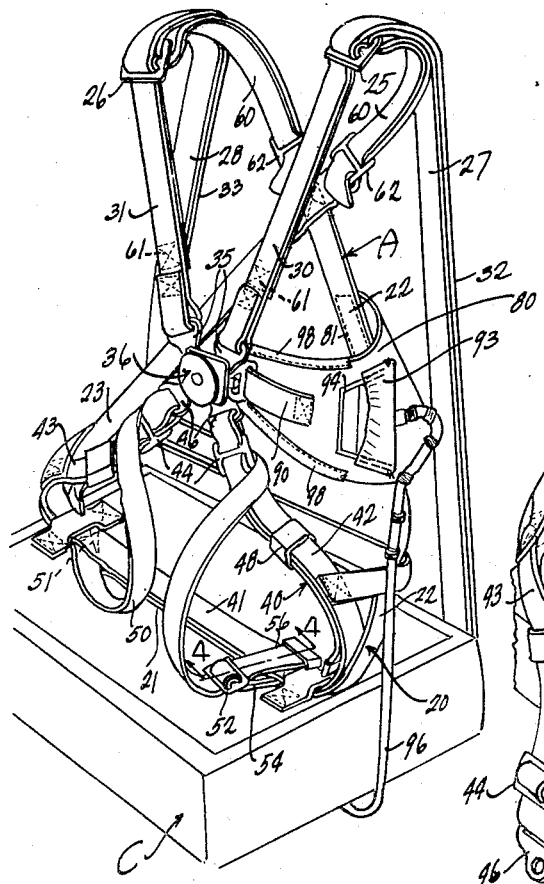
Figure 6:
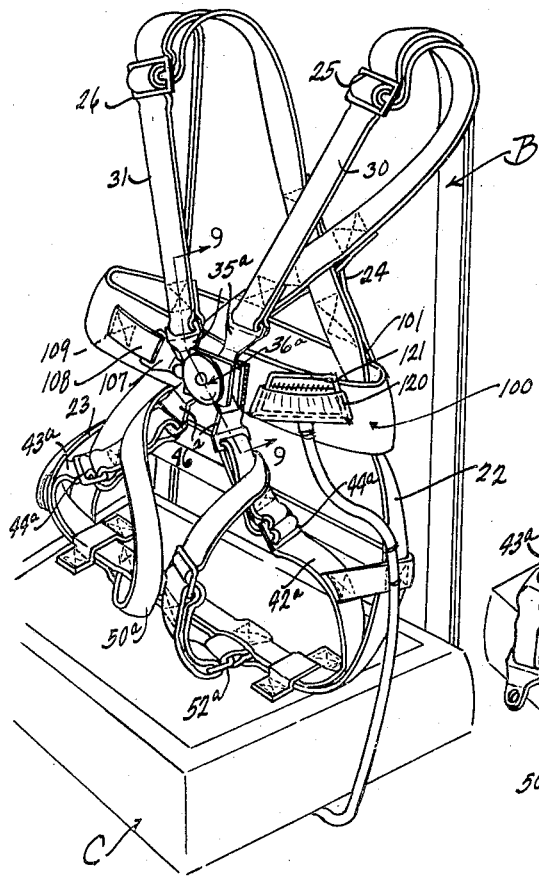
Figure 6 is a perspective view of a modified form of improved single point release harness utilizing a safety waist belt for support of the quick release fastening device and rip cord handle.

In the drawings, wherein for the purpose of illustration are shown preferred and modified forms of the invention, the letters A and B designate the preferred and modified forms of harness illustrated in Figures 1 and 6 respectively, with which a conventional parachute pack C may be used in the usual manner.

The single point release harness illustrated in the present application is of the general type illustrated in U. S. Patent #1,842,611 and 1,899,656.

So far as applicable the harnesses A and B have similar reference characters applied thereto, since they are identical with the exception of certain leg and shoulder strap adjustments, and the waist belts for supporting the single point releases and rip cord handles. Each of these harnesses includes a sling 20 having a seat portion 21. Straps 22 and 23 extend upwardly along the sides contiguous with the seat portion of the sling and diagonally across the back of the wearer to form back straps. If desired slip loops 24 may be provided (see Figure 6) to maintain the back straps in properly crossed relation. At their upper ends the straps 22 and 23 extend through the adapters 25 and 26. Each of these adapters is of the three-bar type providing two loops, and the straps 22 and 23 are threaded through the rearmost loops and extended rearwardly and downwardly in suspension webs 27 and 28. They enter the pack C and are attached to the parachute in a manner set forth in U. S. Patent #1,554,192.

Upper body straps 30 and 31 are provided, which may be appropriately termed shoulder straps. They adjustably extend through the foremost loop openings of the adapters 25 and 26, and their rear portions 32 and 33 overlie respectively with the suspension webs 27 and 28, and similarly cooperate therewith in providing suspension webs which also enter the pack C and are attached to the parachute. The fore portions of the straps 30 and 31 extend from the adapters 25 and 26 convergently downwardly and at their lower ends are provided with slotted fastening devices 35. The latter connect with the quick release fastening device 36 in much the same manner as set forth in the U. S. Patents #1,842,611 and #1,899,656 above described.

A minor U-shaped sling 40 is provided as part of each of the harnesses, including a seat strap 41 stitched fixedly to the seat portion 21 above described. The sling 40 of the harness A furthermore includes the strap portions 42 and 43, adjustable in length by reason of adapters 44. The portions 42 and 43 are each doubled upon themselves and at their free ends are provided with fasteners 46 similar to the fasteners 35 above described, for releasable attachment with the quick release device 36. These doubled portions of the leg straps 42 and 43 are adjustable through the adapters 44, which are of the three-bar two-loop type. The leg straps 42 and 43 are not permanently attached to the adapters 44, but the double thickness of each is threaded through its adapter loops, and the free end of the strap is held against the other portion of the respective leg strap by a slip loop 48, as shown in Figure 1 of the drawings. Pulling the free end of the loop through the adapter 44 adjusts the position of the fastener part 46.

On the seat portion of the parachute harness there is disposed an adjustable strap loop 50 adapted to extend from the seat straps between the legs of the wearer. The leg straps 42 and 43 are releasably threaded through this loop portion 50 to provide leg encircling openings, in a manner which has been specifically described in U. S. Patents Nos. 1,842,611 and 1,899,656 above mentioned. This loop 50 is fixedly connected at one end 51 between the strap portions 41 and 42, that is, upon the seat strap. The seat strap in spaced relation with the connection 51 is provided with an adapter 52, shown in detail in Figure 4, which is of the three-bar-two-loop opening type. The center bar 53 has a flexible strap loop 54 connected therewith; the latter being stitched permanently as at 55 upon the seat of the sling, preferably between the seat strap portions 21 and 41. The loop 54 is relatively short. The free end of the loop 50 is threaded through the two loop openings of the adapter 52, over the top of the loop 54 and by pulling this free end 56 the loop 50 may be enlarged or restricted in size as desired.

Figure 2:
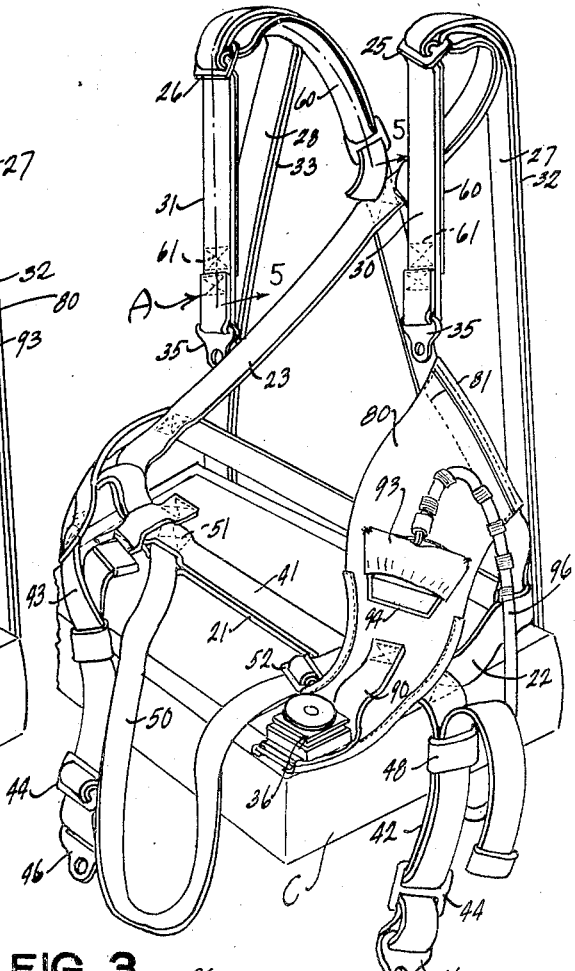
Figure 2 is a perspective of the parachute harness illustrated in Figure 1, with the quick release fastening released from its complementary fastener parts of the harness.

In the harness A illustrated in Figures 1 and 2, the adapters 25 and 26 are provided with means to hold a definite desired adjustment. While shoulder adapters such as set forth in my copending application, Serial No. 717,858, are ordinarily satisfactory in holding the adjustment, there are times when the three-bar type of adapter will slip out of place. To remedy this I have provided a flexible retaining web or strap 60 which is permanently stitched to either the upper front or back strap, and slidably extended through the shoulder adapter and at its free end held by some adjustment upon the other body strap. One way of accomplishing this is illustrated in Figures 1, 2 and 5, where the retaining web or strap 60 is stitched permanently at 61 to the front upper strap 31. It underlies the straps 22 and 31 and is extended in threaded adjustment through the two loop openings of the adapter 26, over the top of the center bar of said adapter, as shown in Figure 5. The free end of the retaining web 60 is held by means of an adapter 62. Such adapter 62 is permanently secured as at 63 to the back strap 22, on the outer surface thereof, adjacent the shoulder, and of course the back strap itself is threaded through both of the loop openings of the adapter 62, and the free end of the retaining strap 60 is similarly threaded in order that tension upon the strap 22 will hold the adjustment of the free end of the retaining member 60. It is quite apparent from Figure 5 that with the retaining strap 60 in such adjustment, the adapter 26 cannot ride upwardly upon the suspension web portions 28 and 33, so that the proper adjustment of the adapter 25 or 26, as the case may be, upon the shoulder straps of the harness, will be maintained.

Figure 7:
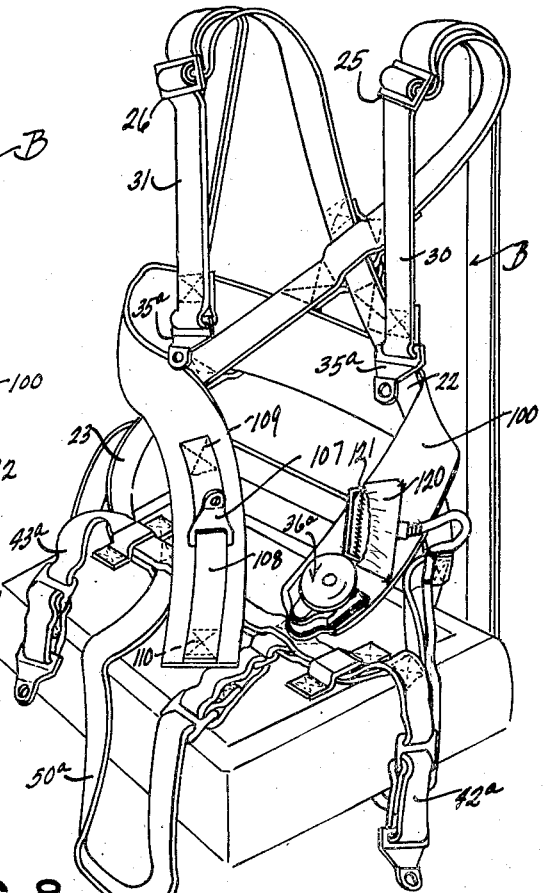
Figure 7 is a perspective view of the harness of Figure 6 with the ends of the harness disconnected from the quick release fastening device.

In the form of invention shown in Figures 6 and 7 the shoulder adapters 25 and 26 are the same as in the preferred form of invention A, except for the retaining webbing 60 and the means attaching the same in place.

The leg straps 42ᵃ and 43ᵃ are the same as the straps 42 and 43 respectively of the preferred form A except that their adjustment is somewhat different. The fasteners 46ᵃ are adjustably secured in place on these straps 42ᵃ and 43ᵃ by doubling the said straps upon themselves and adjustably securing them to adapters 44ᵃ, which are of the character described in my co-pending application, Serial No. 717,858. Similarly the loop 50 of the harness A, which extends upwardly between the legs of the wearer, has an adjustment 52ᵃ which is of the same character as that set forth in my co-pending application, Serial No. 717,858.

Referring again to the form of harness A I provide a wide supporting or backing member 80, which is preferably of flexible webbing or other material. It is permanently stitched or otherwise secured as at 81 upon the strap 22, which may either be a side strap or a back strap. It is preferably extended around the side and to the front of the wearer in the vicinity of the waist of the wearer, preferably slightly above the waist. It tapers with decreasing width toward its free end whereon the single point release fastening device 36 is adjustably connected.

Figure 3:
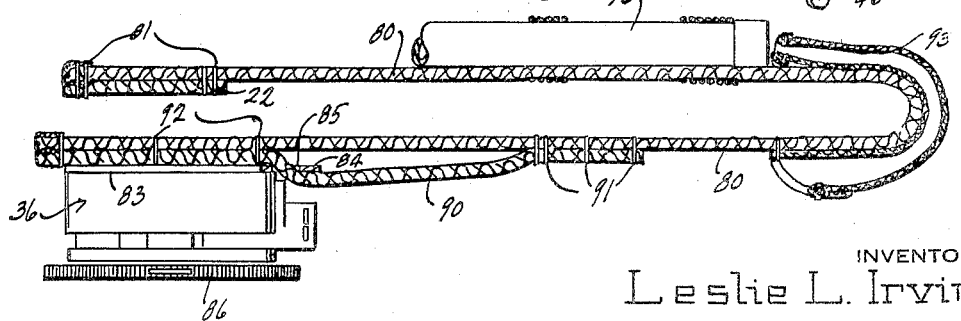
Figure 3 is an enlarged cross sectional view taken through the improved supporting means for the rip cord handle and quick release fastening device.

The said releasable fastening device 36 is of the character described in U. S. Patents #1,842,611 and 1,899,656 above described, and it includes a frame having a back plate 83 with an attaching extension 84, apertured at 85. The said quick release device includes an operating member 86, which is preferably a rotatable and depressible member controlling the tripping and actuation of detents which restrain the fasteners 35 and 46 of the harnesses above described. On the front of the supporting belt or web 80, at the free end thereof there is provided a narrow connecting strap 90, which is fixedly secured at its ends 91 and 92, as by stitching, to the supporting strap or member 80, as shown in Figures 1, 2 and 3 of the drawings. The intermediate connecting portion of the strap 90 is loose and is threaded through the aperture 85 for holding the quick release fastening device 36 in proper position. The slot 85 is elongated and narrow, so that the fastener 36 cannot turn upon the strap 90. The stitching 92 is disposed inwardly from the free end of the supporting belt or member 80 such distance that when the extension 84 of the quick release fastening device is in its most forward position upon the strap 90 a portion of the supporting member 80 will lie behind the quick release fastener 36 to serve as a pad. Due to the fact that the extension 84 lies in about the same plane as the rear surface of the quick release fastening device 36, when the latter is pressed against the supporting belt or member 80 with the harness straps connected therewith, the loose portion of the connecting strap 90 will be deflected, as shown in Figure 3, in order to hold the adjustment of the release fastener 36 upon this loose portion of the strap 90, and it cannot slip therealong until the fasteners 35 and 46 are released and the quick release fastening device 36 tilted out of parallelism with the adjacent portion of the supporting web 80.

The supporting web or member 80 has the rip cord pocket 93 attached therewith. This pocket is of the character set forth in U. S. Patents No. 1,758,795 and No. 1,758,871 and substantially identical with the pocket shown in Figure 5 of the latter patent. The rip cord handle and rip cord mechanism are substantially the same as shown in the last two mentioned patents. The pocket 93 is disposed with its length vertical or cross-wise of the supporting belt or strap 80; the latter being of a width greater than the length of the rip cord pocket 93, so that the rip cord handle 94 may be disposed in the pocket with the hand grasping portion facing in the direction of the quick release fastener 36, so that the wearer may with facility grasp the rip cord with his or her right hand. The pocket 93 retains the rip cord ring or handle 94 therein by reason of the divergent formation of the sides of the rip cord handle, and the fact that the entrance to the pocket 93 is resiliently restricted by elastics in the mouth of the pocket. The rip cord extends through an opening in the bottom of the pocket and is protected in a guard housing 96 which leads to the fasteners of the pack C in a manner well known in the art and more specifically set forth in U. S. Patents Nos. 1,403,983 and 1,554,192.

The material of the support or belt 80 may be of webbing. While it is flexible it is not transversely collapsible, and to hold its form without doubling under suitable stiffeners may be provided, or stiffening edging 98 may be sewn or disposed along the marginal edges thereof, as shown in Figures 1 and 2.

Figure 8:
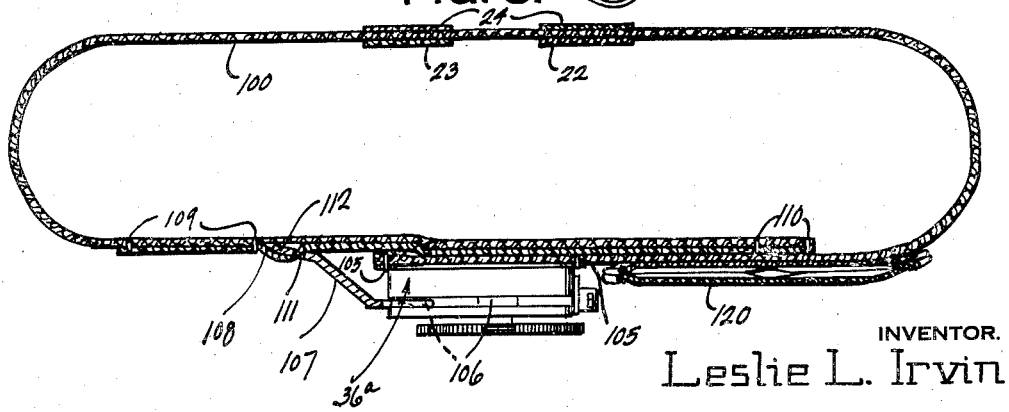
Figure 8 is a horizontal sectional view taken through the waist belt of the harness of Figures 6 and 7.

In the form of invention B I have provided a belt 100 of webbing or other material which extends around the wearer in the vicinity of the waist. Intermediate its ends it is slidably threaded through suitable loop openings 101 in the back straps 22 and 23 below their crossing point. The ends are brought forwardly and overlap at the front of the wearer where they are connected by one of the quick release devices 36ª. This quick release device 36ª has its frame directly stitched fixedly in place at 105 on one of the ends of the belt 100, and it is provided with five detents 106, four being positioned for releasable connection with the fasteners 35ª and 46ª, and the other one of which is positioned for releasable connection with a fastener 107, similar to the fasteners 35ª and 46ª, which, however, is slidably connected upon a connecting strap 108. This strap 108, shown in Figures 6, 7 and 8 of the drawings, is stitched at one end at 109 upon the belt and extends in parallelism along the front of the same end of the belt to the extreme end thereof where it is stitched at 110, as shown in Figures 7 and 8 of the drawings. The intermediate loose portion of the belt 108 receives the fastener 107 thereon in such relation that the said fastener may be adjusted in any position therealong to suit the circumference of the belt to the stature of the wearer. The fastener 107 is provided with a slot 112 which receives the connecting strap 108 therein and when the fastener 107 is in position where it is connected with the release fastener 36ª the connecting strap 108 will be crimped, as shown in Figure 8, to hold the position of the fastener 107 thereon against sliding.

As shown in Figures 8 and 9 of the drawings all of the fastener devices 35ª, 36ª, and 107 are formed so that when connected with the quick release fastening device 36ª they will not tend to press the latter into the body of the wearer. That has been a discomforting feature of quick release fasteners of the general character set forth in U. S. Patents Nos. 1,842,611 and 1,899,656. To obviate the difficulty each of the said fasteners has its apertured strap attached ends offset from the apertured ends adapted for connection with the detent of the quick release fastener device, by means of a canted intermediate portion, as shown in Figures 8 and 9 of the drawings. The fasteners, to accomplish this result, may be bent or formed in various ways, but the essential difference is that the strap attached ends are offset from the detent attaching ends so that the straps to which the fastener parts are respectively attached may lie against the body of the wearer and the fasteners attached to the detents of the one point release mechanism without pressing the latter into the body of the wearer.

As shown in Figures 6, 7 and 8 of the drawings, the belt 100 is provided on the front thereof, adjacent to the quick release fastening device 36ª, with a pocket 120 similar to the pocket 93 above described, for receiving a rip cord ring 121 similar to the rip cord ring 94 above described. If desired the belt may be of full width to permit the length of the pocket to lie at right angles to the circumferential line of the belt, but as shown in Figures 6 and 7 of the drawings the pocket may be placed at an angle to the horizontal, if desired, in order that the belt may be made narrower and still face the hand grasping portion of the rip cord ring in convenient position for pulling. The rip cord and housing are conventional in arrangement.

The improved features of the present invention, particularly insofar as the provision of a protecting belt or supporting web or member for the rip cord pocket is concerned, are adaptable to the so called "standard" type of parachute harness as set forth in U. S. Patent No. 1,560,366. In that type of harness, as well as some other types, it has been common to place the rip cord ring and its pocket upon a strap extending from the lower portion of the body towards the shoulders. That position is sometimes rather inaccessible, particularly in view of heavy clothing usually worn by the aviator, and folds of the clothing having a tendency to interfere with proper manipulation of the rip cord ring. It can readily be understood that this disadvantage has been overcome in the present arrangement because the supporting or backing belt or member is sufficiently stiff to hold the clothing in proper place and the same will not double or crimp.

While I have shown the rip cord pocket as secured permanently to the belt or backing member, it may be adjustably secured thereon, if found desirable.

The means for adjustably anchoring the adapters at the shoulders in the form of harness A is adaptable for other types of harness than the quick release harness shown.

Various changes in the shape, size, and arrangement of parts may be made to the form of invention herein shown and described, without departing from the spirit of the invention or the scope of the claims.

I claim:

1. In parachute harness the combination of body attaching straps including a waist belt having a fastener part on one end and a strap connected longitudinally on the outer side of the other end of the strap and fixedly connected at its ends on said strap and having an intermediate loose portion, and a complementary fastener part having an eye through which the loose portion of said strap is threaded so that the said second fastener part is slidable along the loose portion, said eye being normal to the general line of said strap so as to crook the belt and remain anchored thereon in definite position when connected with the fastener part first mentioned.

2. In parachute harness the combination of back and front straps adapter to pass over the shoulder of a wearer, an adapter adjustably receiving the straps therethrough and having the ends thereof extending to provide parachute canopy suspension lines, means for adjustably anchoring the adapter with respect to said straps in a set adjustment thereof, said means consisting of another strap secured at one end to one of said first mentioned straps slidably connected with the adapter and having an adjustable adapter connection with the other of said first mentioned straps.

3. In parachute apparatus the combination of a harness including back straps and front straps at each side of the wearer having adapters in the vicinity of the shoulders for connecting the respective back and front straps at each side of the wearer, said adapters being slidable on said straps and the ends of the said back and front straps beyond the adapters providing suspension lines for the canopy of the parachute, and means attached to the respective back and front straps for adjustably anchoring the adapters in set non-slidable relation in one direction with respect to the front and back straps on which they are respectively slidable.

4. In parachute apparatus the combination of a harness including back straps and front straps at each side of the wearer having adapters in the vicinity of the shoulders for connecting the respective back and front straps at each side of the wearer, said adapters being slidable on said straps and the ends of the said back and front straps beyond the adapters providing suspension lines for the canopy of the parachute, means attached to the respective back and front straps for adjustably anchoring the adapters with respect to the front and back straps on which they are respectively slidable, said last mentioned means including a strap slidably connected intermediate its ends with the adapter with means to secure the ends of said last mentioned strap on the respective front and back straps with which the respective adapter is connected including an adjustment to shorten the length of said last mentioned strap.

5. In a parachute harness coupling the combination of a quick release fastener including a base and a releasable detent disposed thereon spaced outwardly from the base, and a complementary fastener part for the quick release fastener having a strap attaching end and an apertured end for releasable connection with the detent of said quick release fastener, said apertured end being offset forwardly from the strap attaching end whereby when the complementary fastener part is connected with the detent of the quick release fastener the strap attaching end lies substantially in the same plane with the base of the quick release fastener.

6. In an aviator's harness the combination of a pair of straps adapted to engage about the body of the wearer, an adapter adjustably receiving the straps therethrough to hold the straps together for adjustable connection upon a wearer and having the straps slidable therethrough, and means for adjustably anchoring the adapter in a set position with respect to said straps to prevent sliding movement of both of said straps in one direction with respect to said adapter but permitting free sliding adjustment of the strap with respect to said adapter in the opposite direction.

LESLIE L. IRVIN.